No. 679,214. Patented July 23, 1901.
R. M. BRYANT.
LOCOMOTIVE.
(Application filed Apr. 2, 1901.)
(No Model.) 2 Sheets—Sheet 1.
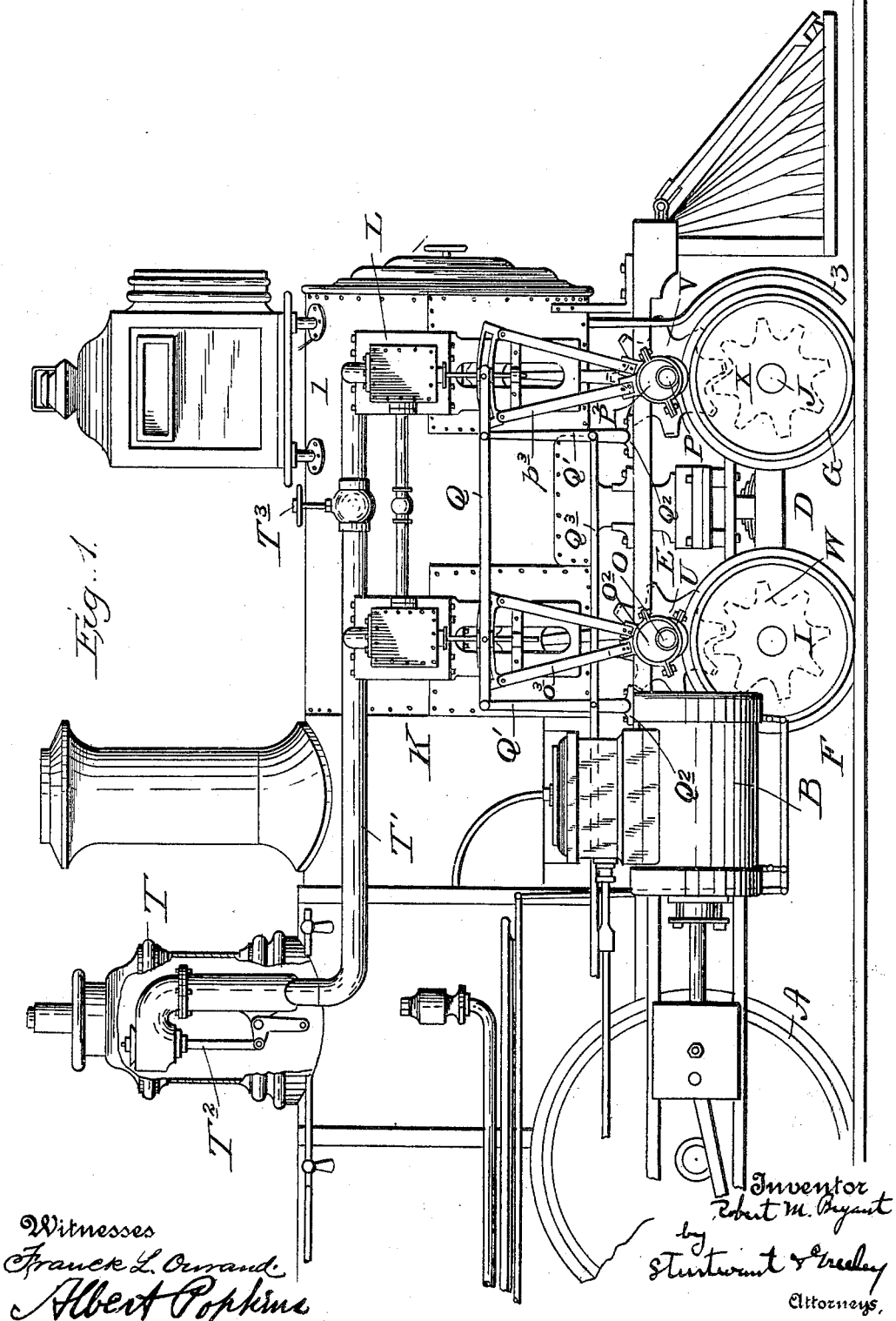

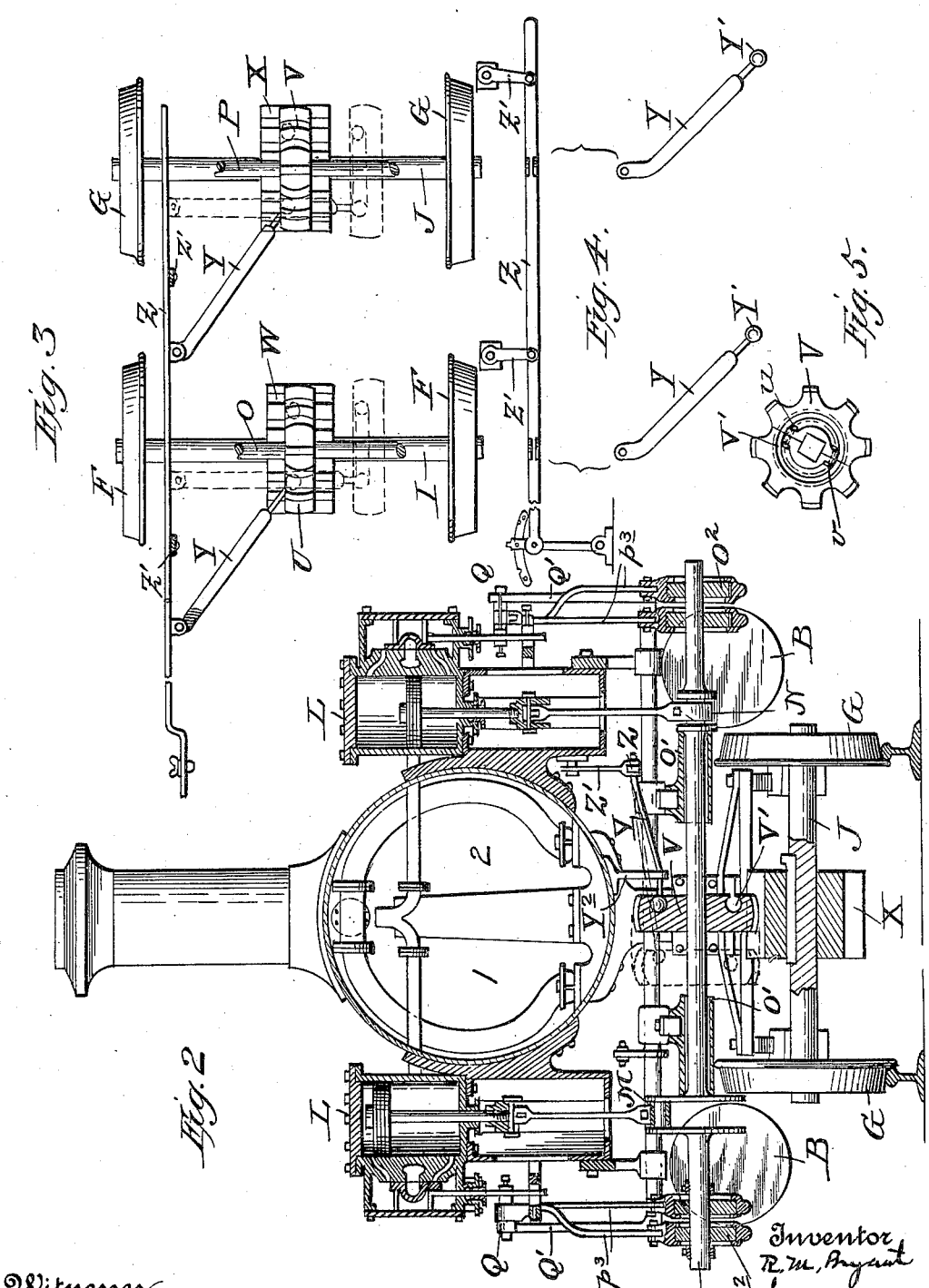

UNITED STATES PATENT OFFICE.

ROBERT M. BRYANT, OF RIDERVILLE, ALABAMA.

LOCOMOTIVE.

SPECIFICATION forming part of Letters Patent No. 679,214, dated July 23, 1901.

Application filed April 2, 1901. Serial No. 54,077. (No model.)

*To all whom it may concern:*

Be it known that I, ROBERT M. BRYANT, a citizen of the United States, residing at Riderville, in the county of Chilton, State of Alabama, have invented certain new and useful Improvements in Locomotives, of which the following is a description, reference being had to the accompanying drawings and to the characters of reference marked thereon.

My invention relates to locomotives in which the traction of the driving-wheels usually employed may be assisted when heavy loads are to be hauled or when ordinary loads are to be hauled on upgrades by the use of auxiliary driving means applied to the wheels of the pilot-truck or to other wheels not ordinarily employed as traction-wheels, such auxiliary means not being used on downgrades or levels or with light loads; and my invention consists in the construction herein shown and described whereby the speed of direct-driven traction-wheels of large diameter may be secured and the high hauling power of geared traction-wheels of small diameter may be utilized when desired without the one in any way interfering with or detracting from the use of the other.

In the drawings, Figure 1 is a side view of so much of a locomotive as is necessary to show my invention. Fig. 2 is a front view, partly in section, showing my invention. Fig. 3 is a horizontal sectional view on line $x\ x$ of Fig. 2. Fig. 4 is a detail view of the means for shifting the gears into and out of gear, and Fig. 5 is a detail view of the gearing of the auxiliary driving mechanism.

Referring to the drawings, A indicates the driving-wheels of a locomotive driven through the usual connections from the cylinders B, steam being led to these cylinders in the usual way from the steam-dome C.

Under the forward end of the locomotive is placed the usual pilot-truck D, pivoted on the king-bolt E and having the wheels F F and G G and axles I and J. Securely bolted to the forward extension of the boiler, immediately over the axles I and J, are auxiliary vertical twin engines K K and L L, arranged in pairs on opposite sides of the extension of the boiler, K K being arranged to drive, through the intermediate gearing hereinafter described, the axle I, with its wheels F F, and L L being arranged to drive the axle J, with its wheels G G. The driving-rods of these engines are connected to cranks M M and N N of transverse shafts O and P, the cranks on each shaft being arranged quartering. The shafts O and P are carried in bearings O' and P', arranged on the framework below the boiler extension. These shafts are extended outward, carrying near their outer ends the eccentrics $O^2$ and $P^2$, arranged in the usual way to operate through the links $O^3$ and $P^3$ the valve-rods of the engines K K and L L.

The links of the pair of engines on each side of the locomotive are connected by a horizontal rod Q, pivotally supported by upright rods Q' Q', the lower ends of which are carried in bearings $Q^2$ $Q^2$, secured to the frame of the locomotive. Connected to the upright rods $Q^2$ $Q^2$ a short distance above their lower ends is a horizontal rod $Q^3$, which is connected to the valve-rod of the main cylinder, so that the reversing-lever, by which the links of the main engine are shifted, controls the links of the auxiliary engines. Thus the admission of steam to the cylinders of the auxiliary engines will be controlled simultaneously with the admission of steam to the main cylinder.

Steam is supplied to the steam-chests of the auxiliary engines from steam-dome T through steam-pipe T', as shown, admission of steam to the pipe T' being controlled by throttle-valve $T^2$, controlled through rod by a throttle-lever in the cab of the locomotive. The steam-pipe T' between the cylinders of the two engines, which it supplies with steam, is preferably provided with a hand-valve $T^3$, by which steam may be cut off from the forward one of the two engines for the purpose of repair or other purposes.

On the transverse shafts O and P are located gear-wheels U and V, gearing into and driving gears W and X, keyed to the axles I and J. The gears W and X have broad faces and are adapted to be shifted longitudinally on the axles I and J, as may be found desirable. The gears U and V have their faces rounded, as shown, so that the pilot-truck may be free to pivot on its king-bolt E without injury to the gearing. The portions of the shafts O and P which carry the gears U and V are square in cross-section, and these gears U and V are arranged to be shifted longitudinally on their respective shafts to throw them into and out of gear with the gears W and X.

The means by which the gears U and V are shifted longitudinally of their respective shafts to throw them into and out of gear with the gears on the axles of the driving-truck are as follows: In the face of each of these gears is cut a T-shaped groove U' V', in which is received the enlarged end Y' of a lever Y. The other ends of the levers Y are pivotally secured to a longitudinal rod Z, which extends rearwardly to the cab of the locomotive, preferably on the fireman's side, where it is operatively connected with a hand-lever. The rod Z, near its forward end, is hung by links Z' from a fixed portion of the locomotive-frame, preferably from the framework of the engines K L on the left or fireman's side of the locomotive. Near the gears U and V the levers Y pass through holes $Y^2$ in a hanger $Y^3$, secured to a fixed portion of the locomotive, preferably, as shown, to the forward extension of the boiler.

The gears U and V are preferably made in two parts, the parts being secured together by bolts $u$ $v$. These gears, as well as the gears W and X, may be formed of any desired number of gear-teeth.

By arranging the auxiliary engines directly above the pilot-truck their weight aids in giving the downward pressure on the wheels necessary to prevent slipping. The weight upon the wheels of the pilot-truck is further increased by forming in the front end of the boiler extension a sand-box 1, the rear wall of said sand-box being formed by a partition 2. From the sand-box tubes 3 lead downward, as shown, to deliver sand directly in front of the front wheels of the pilot-truck. The weight of this box, especially when full or nearly full of sand, increases the weight on the traction-wheels to a material extent. If found desirable, pig-iron or other weights may be placed on the frame of the locomotive over the pilot-truck.

By the construction above described I secure in a single locomotive the advantage for hauling loads on upgrades or for hauling heavy loads, where increased power and less speed are needed, of geared traction-wheels, and for downgrades or light loads, where less power and more speed are desired, the advantages of directly-driven traction-wheels, so that for heavy hauling I secure the maximum traction at the lower speed which is necessary when gearing is used, and for light hauling I secure the high speed which can be attained only by directly-driven traction-wheels, at the same time disconnecting the auxiliary engines and the gearing by which they are connected with the small traction-wheels, so that the auxiliary gearing is not liable to injury when the locomotive is running at high speed or downgrade with a heavy load behind it.

In other words, I secure in one machine the advantages of a geared locomotive for heavy loads and upgrades and the advantage of a directly-driven locomotive for speed on downgrades and with light loads on grade, which advantages have heretofore been attainable only by the use of two separate locomotives, which is generally impracticable.

While I have shown an auxiliary engine arranged to drive each of the axles of the pilot-truck, it should be understood that one of these axles only may be driven.

Having thus described my invention, what I claim, and desire to secure by Letters Patent, is—

1. In a locomotive, the combination of traction-wheels, a main engine arranged to drive said wheels directly, a pilot-truck and an auxiliary engine arranged to drive the wheels of the pilot-truck through intermediate gearing; substantially as described.

2. In a locomotive, the combination of traction-wheels, a main engine arranged to drive said wheels directly, a pilot-truck having wheels arranged to normally rotate freely, and an auxiliary engine arranged to drive the wheels of the pilot-truck through intermediate gearing; substantially as described.

3. In a locomotive, the combination of traction-wheels, a main engine arranged to drive said wheels directly, a pilot-truck having wheels arranged to normally rotate freely, an auxiliary engine arranged to drive the wheels of the pilot-truck through intermediate gearing, and means for throwing the auxiliary engine into and out of gear with the wheels of the pilot-truck; substantially as described.

4. In a locomotive, the combination of traction-wheels, a main engine arranged to drive said wheels directly, a pilot-truck having wheels arranged to normally rotate freely, an auxiliary engine arranged to drive the wheels of the pilot-truck through intermediate gearing, means for throwing the auxiliary engine into and out of gear with the wheels of the pilot-truck, means for controlling the supply of steam to the auxiliary engine and independent means for controlling the supply of steam to the auxiliary engine; substantially as described.

5. In a locomotive, the combination of traction-wheels, a main engine arranged to drive said wheels directly, a pilot-truck having wheels arranged to normally rotate freely, an auxiliary engine arranged to drive the wheels of the pilot-truck through intermediate gearing, means for throwing the auxiliary engine into and out of gear with the wheels of the pilot-truck, means for controlling the supply of steam to the main engine, independent means for controlling the supply of steam to the auxiliary engine, and means whereby the reversing-gear and cut-off of the main and auxiliary engines may be simultaneously controlled.

6. In a locomotive, the combination of the main engine and its drive-wheel, of a vertically-arranged auxiliary engine located directly over the pilot-truck and arranged to drive the wheels of said pilot-truck through intermediate gearing, separate throttle-valves for the two engines, means for simultaneously controlling the cut-off and reversing-gear of the two engines, and means whereby the auxiliary engine may be disconnected from the truck-wheels to permit the latter to revolve freely; substantially as described.

In testimony whereof I affix my signature in presence of two witnesses.

ROBT. M. BRYANT.

Witnesses:
FRANK D. BLACKISTONE,
A. P. GREELEY.